(No Model.)
J. FERREL.
COMBINED LADDER TRUCK AND HOSE CARRIAGE.
No. 360,286. Patented Mar. 29, 1887.
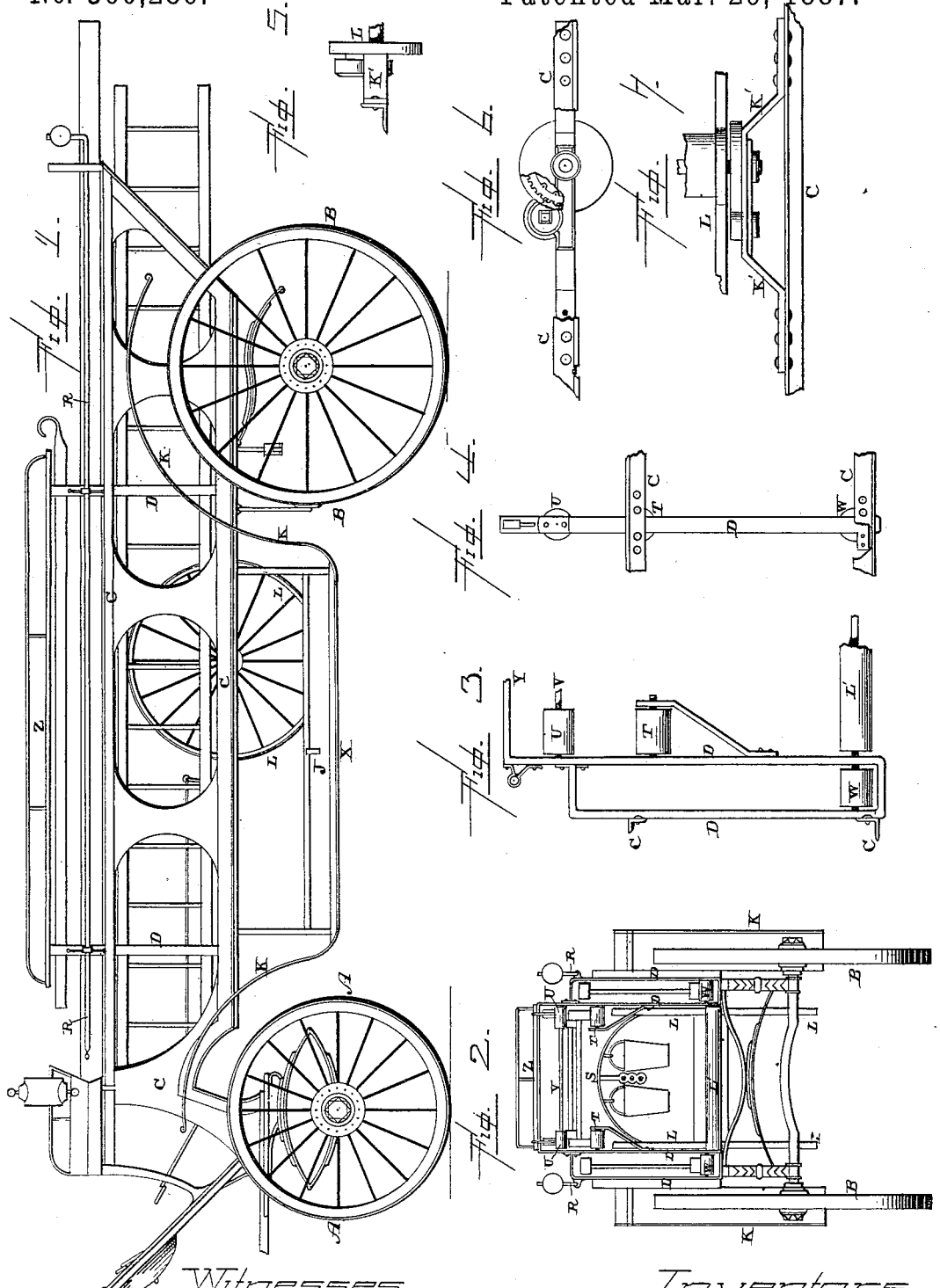
Witnesses.
R. L. Gardner
Edw. P. Ellis
Inventors.
Jno. Ferrel
per J. W. Lehmann, atty.

UNITED STATES PATENT OFFICE.

JOHN FERREL, OF ZANESVILLE, OHIO.

COMBINED LADDER-TRUCK AND HOSE-CARRIAGE.

SPECIFICATION forming part of Letters Patent No. 360,286, dated March 29, 1887.

Application filed January 19, 1887. Serial No. 224,794. (No model.)

*To all whom it may concern:*

Be it known that I, JOHN FERREL, of Zanesville, in the county of Muskingum and State of Ohio, have invented certain new and useful Improvements in Combined Ladder-Trucks and Hose-Carriages; and I do hereby declare the following to be a full, clear, and exact description of the invention, such as will enable others skilled in the art to which it pertains to make and use it, reference being had to the accompanying drawings, which form part of this specification.

My invention relates to an improvement in combined ladder-trucks and hose-carriages; and it consists in the combination and arrangement of parts, which will be more fully described hereinafter, and set forth in the claims.

The object of my invention is to combine in a single vehicle a ladder-truck and a hose-carriage which is capable of being turned around within its own length; to secure to the frame suitable brackets for supporting the ladders in position above and on the sides of the reel which extends across the frame in front of the rear wheels, and to so combine the parts that the reel may be wound and unwound and the ladders removed from or returned to position at the same time without in any way interfering with each other.

Figure 1 is a side elevation of a truck and carriage embodying my invention. Fig. 2 is an end view of the same. Figs. 3, 4, 5, 6, and 7 are detail views of the same.

A represents the front wheels, B the rear ones, and C a metallic frame, which is arched at its front end, so as to allow the front wheels, A, to turn freely around, and thus enable the truck to be reversed within its own length. In connection with the wheels and the frame there may be used any suitable springs preferred, as they form no particular part of this invention. Secured to the frame, inside of the two sets of wheels, are the guards K, which extend over the wheels, as shown in Fig. 1, and which guards are connected to the step X, upon which is secured a tool-box, J.

Secured to the inner sides of the frame, upon each side, are a suitable number of brackets, D, as shown in Figs. 3 and 4, and which brackets are connected together by the cross-piece Y at their upper ends, so as to form a support for the platform Z, upon which the horse-blankets and other such articles are placed. Extending around this platform Z is a suitable railing to prevent the articles placed thereon from falling off. The outer horizontal portions of the brackets are formed into oblong guides, in the bottom of which are placed the friction-rollers W for the ladders to move upon. These ladders are turned upon their edges and then are pushed along upon the rollers W into the position shown in Figs. 1 and 2.

Secured inside of the upper portion of the brackets D is a rod, V, which extends across from one side to the other, and upon which are placed the friction-rollers U, which serve as guides for the scaling-ladders. Supported upon suitable journals inside of the brackets are also the friction-rollers T, upon which the extension-ladders are placed. These three sets of ladders are placed in the relation to each other, as shown, so that any desired ladder or sets of ladders can be instantly removed and replaced in position without disturbing any of the others. Extending across from one side of the beam to the other is the arched bar S, upon which are hung the buckets, forks, and crow-bar. This bar S extends across the frame in front of the hose-reel, so as to not be in the way at any time. The hand-rails R are passed through suitable eyes upon the upper parts of the brackets, and have lanterns or torches secured to their rear ends for the purpose of giving light at night.

The reel L, to receive the hose, extends across the frame, as shown, has its ends journaled in the frame-work, and is adapted to carry any desired length of hose. When it is desired to operate this reel by means of a spur pinion and wheel, as seen in Figs. 5 and 6, a bracket, K', will be secured to the inner side of the frame C, so as to form bearings for the journals. By applying a crank to the spur-pinion one man can readily wind the hose upon the reel. Upon the same shaft as the one upon which the rollers W are placed may be placed a guiding-roller, L', which will serve for guiding the hose to and from the reel.

It will readily be seen that by the arrangement and construction of parts here shown the truck and hose-carriage can be operated with one-half the force that would be required to operate a hose-carriage and ladder-truck separately, as well as saving one team of horses.

The ladders can be taken off and the hose unreeled at the same time, so that no time is lost when the apparatus is brought into active service. When a truck constructed as here shown arrives at a fire, everything necessary to begin operation with is ready, thereby effecting a great saving of time at the most critical period. The ladders and hose being brought upon the ground at the same time, the ladders may be placed against the building and the hose run up the side of the house without having to wait for the arrival of a separate ladder-truck.

Having thus described my invention, I claim—

1. The combination of a suitable frame, C, with the brackets D, secured to their inner sides, and provided with suitable supports for the different kind of ladders, substantially as shown.

2. The combination of the frame-work C with the brackets D, secured to their inner sides, and provided with friction-rollers W U T, the upper portion of the brackets forming a support for a platform, substantially as described.

3. The combination of the frame-work C, the brackets D, secured thereto, and provided with suitable supports for the different kinds of ladders, with the hose-reel which is journaled in the frame, substantially as set forth.

In testimony whereof I affix my signature in presence of two witnesses.

JOHN FERREL.

Witnesses:
W. B. WALTERS,
J. H. JOHNSON.